US012759434B2

(12) United States Patent
Kang et al.

(10) Patent No.: US 12,759,434 B2
(45) Date of Patent: Oct. 13, 2026

(54) ACTUATOR FOR AUTOMOTIVE POWER SEAT SHARING BLDC MOTOR

(71) Applicant: DAS CO., LTD, Gyeongju-si (KR)

(72) Inventors: Sung Won Kang, Incheon (KR); In Yong Park, Incheon (KR); Ji Haeng Jung, Incheon (KR); Jin Woo Lee, Bucheon-si (KR); Young Min Youn, Incheon (KR); Kwang Sin Lee, Hwaseong-si (KR); Jeong Hyun Lim, Suwon-si (KR); Byung Yoon Choi, Seoul (KR); Kwang Su Moon, Hwaseong-si (KR); Jae Yong Lee, Siheung-si (KR)

(73) Assignee: DAS CO., LTD., Gyeongju-si (KR)

( * ) Notice: Subject to any disclaimer, the term of this patent is extended or adjusted under 35 U.S.C. 154(b) by 598 days.

(21) Appl. No.: 18/153,527

(22) Filed: Jan. 12, 2023

(65) Prior Publication Data

US 2023/0373354 A1 Nov. 23, 2023

(30) Foreign Application Priority Data

May 19, 2022 (KR) ........................ 10-2022-0061228

(51) Int. Cl.

*B60N 2/02* (2006.01)
*H02K 5/24* (2006.01)

(Continued)

(52) U.S. Cl.

CPC ........... *B60N 2/02253* (2023.08); *H02K 5/24* (2013.01); *H02K 7/081* (2013.01); *H02K 7/1166* (2013.01);

(Continued)

(58) Field of Classification Search

CPC ............. B60N 2/02253; H02K 11/215; H02K 2211/03; H02K 5/24; H02K 7/081; H02K 7/1166

See application file for complete search history.

(56) References Cited

U.S. PATENT DOCUMENTS 5,237,231 A * 8/1993 Blaettner ............ H02K 5/1732 310/239
2005/0077774 A1* 4/2005 Schwarz ............... B60N 2/686 297/452.18

(Continued)

FOREIGN PATENT DOCUMENTS

WO 2022092840 A1 5/2022

OTHER PUBLICATIONS

Office Action received for Chinese Patent Application No. 202310058763.0, mailed on Jul. 24, 2026, 6 pages (Official Copy only).

*Primary Examiner* — Minnah L Seoh
*Assistant Examiner* — Gregory T Prather
(74) *Attorney, Agent, or Firm* — Renner, Otto, Boisselle & Sklar, LLP

(57) ABSTRACT

An actuator group for an automotive power seat according to the present disclosure includes: three or more types of actuators constituting the automotive power seat, and each actuator of the actuator group includes: a motor assembly 10 having a BLDC motor configured therein; and a reducer assembly 20 coupled to the motor assembly 10 on a side where a motor shaft 15 of the BLDC motor extends and receiving a rotational force of the BLDC motor to decelerate, and the reducer assembly 20 is configured differently from each other depending on a type of an actuator, but the motor assembly 10 is shared.

4 Claims, 15 Drawing Sheets

(51) Int. Cl.
*H02K 7/08* (2006.01)
*H02K 7/116* (2006.01)
*H02K 11/215* (2016.01)

(52) U.S. Cl.
CPC ........ *H02K 11/215* (2016.01); *H02K 2211/03* (2013.01)

(56) References Cited

U.S. PATENT DOCUMENTS

| | | | | |
|---|---|---|---|---|
| 2007/0267923 | A1* | 11/2007 | Oberle | H02K 7/1166<br>310/418 |
| 2022/0363164 | A1* | 11/2022 | Stanic | B60N 2/929 |
| 2023/0387749 | A1* | 11/2023 | Kim | H02K 7/003 |

* cited by examiner

[FIG. 1a]
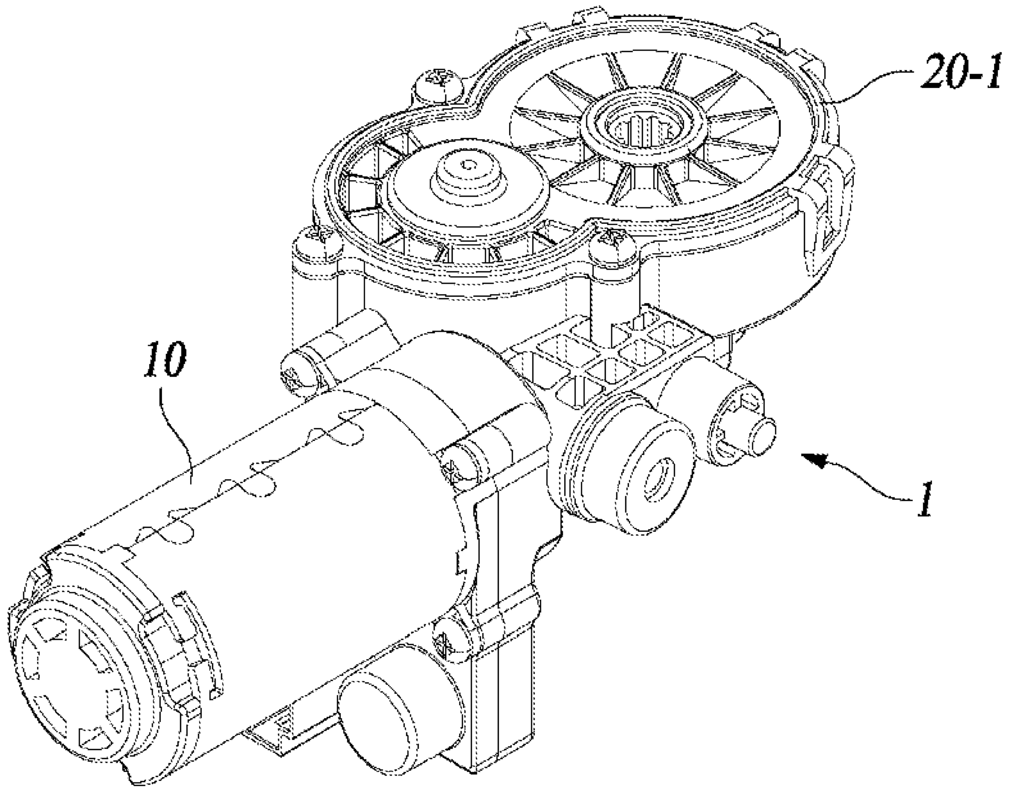

[FIG. 1b]
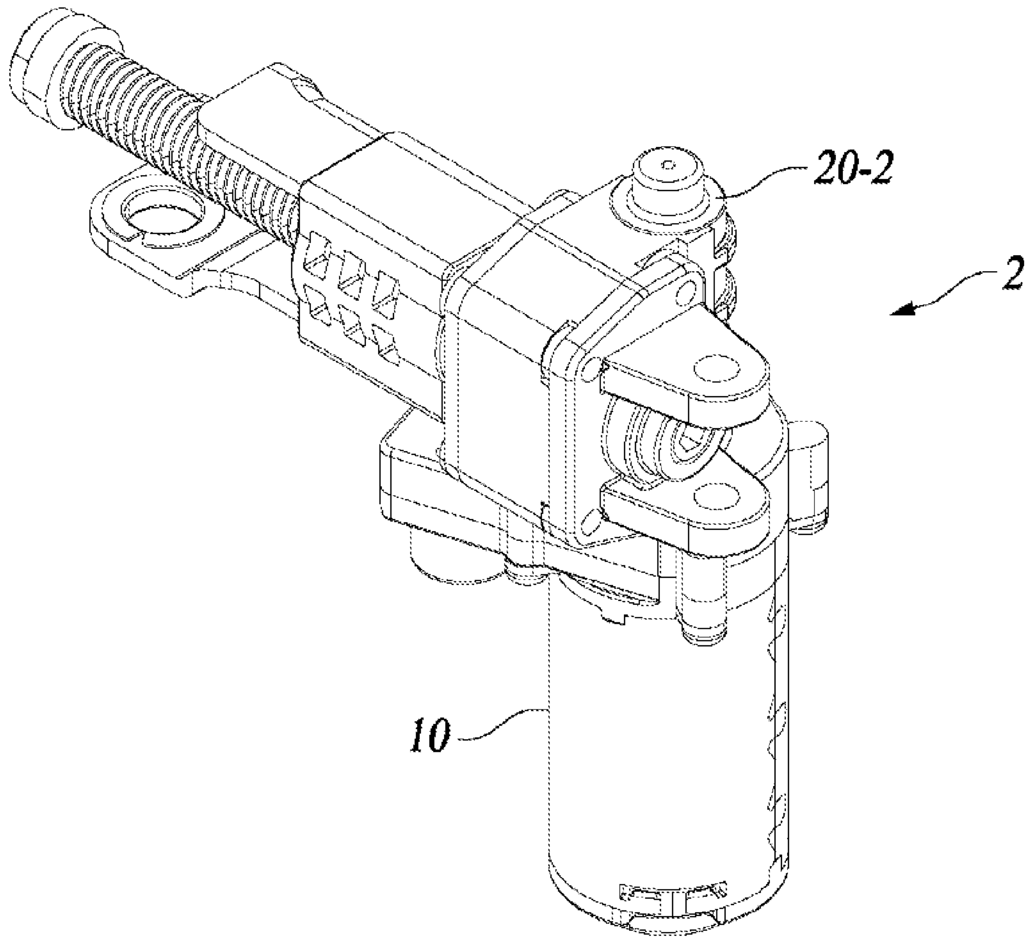

[FIG. 2a]
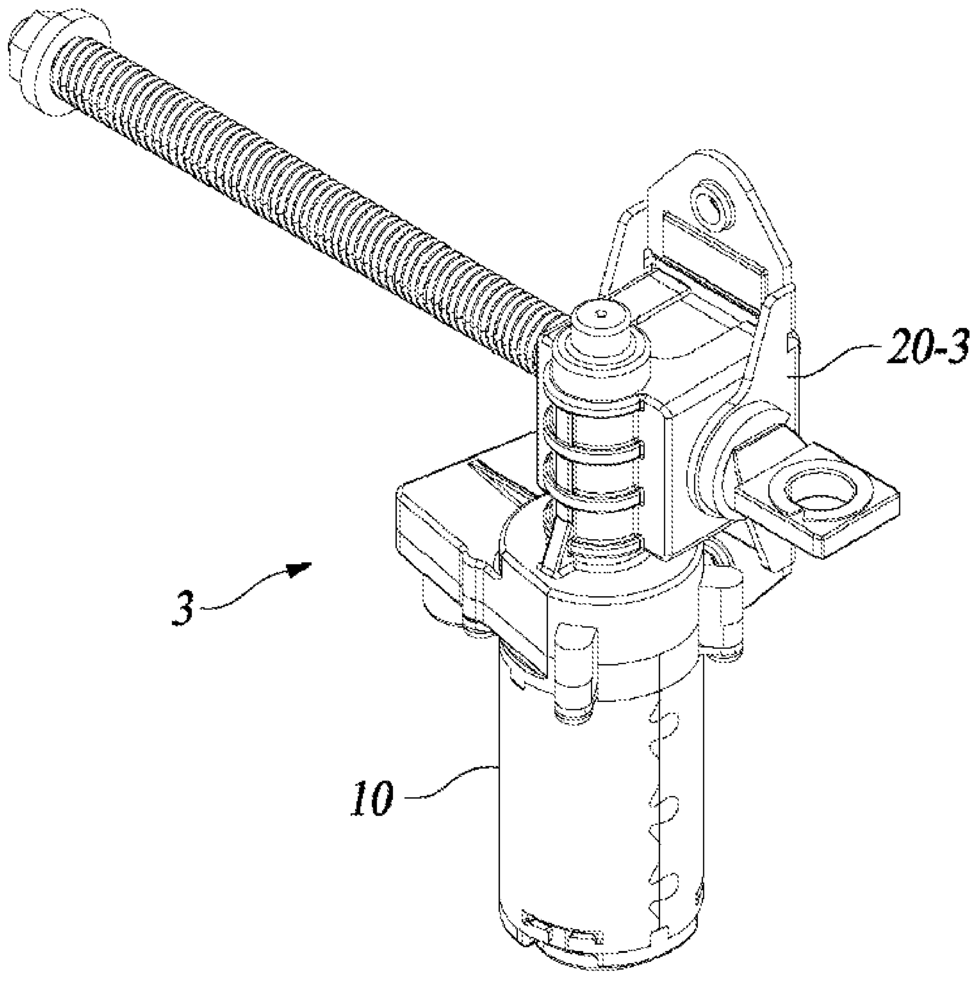

[FIG. 2b]
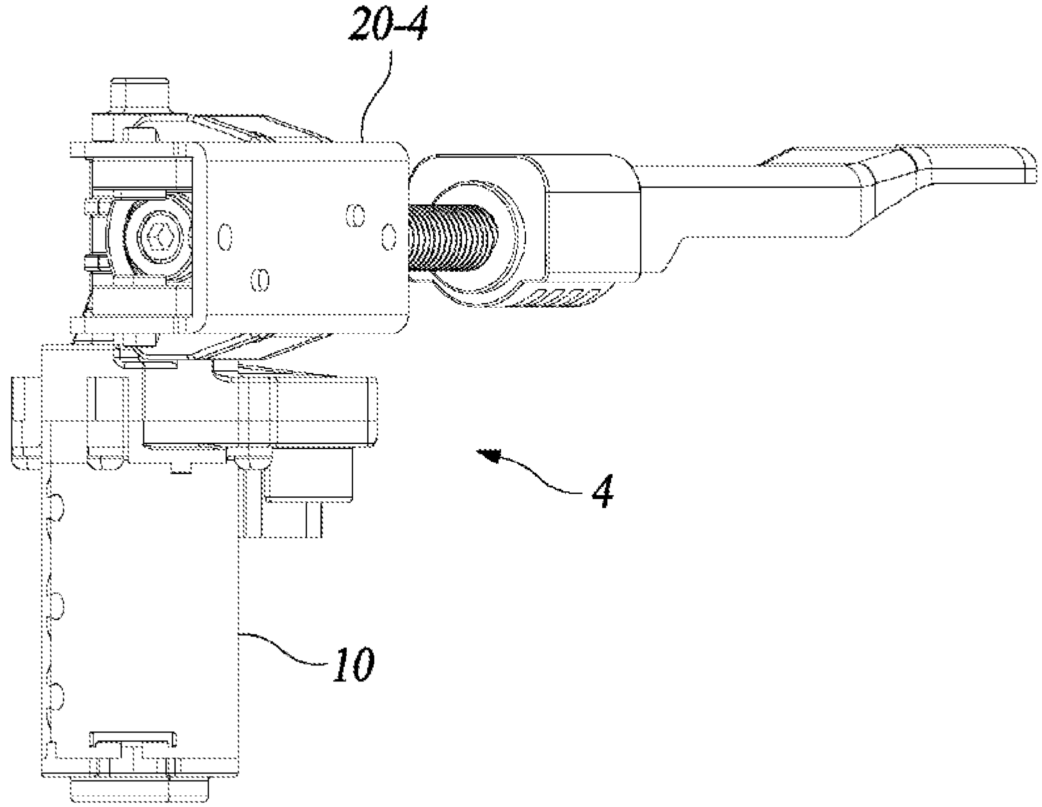

[FIG. 3]
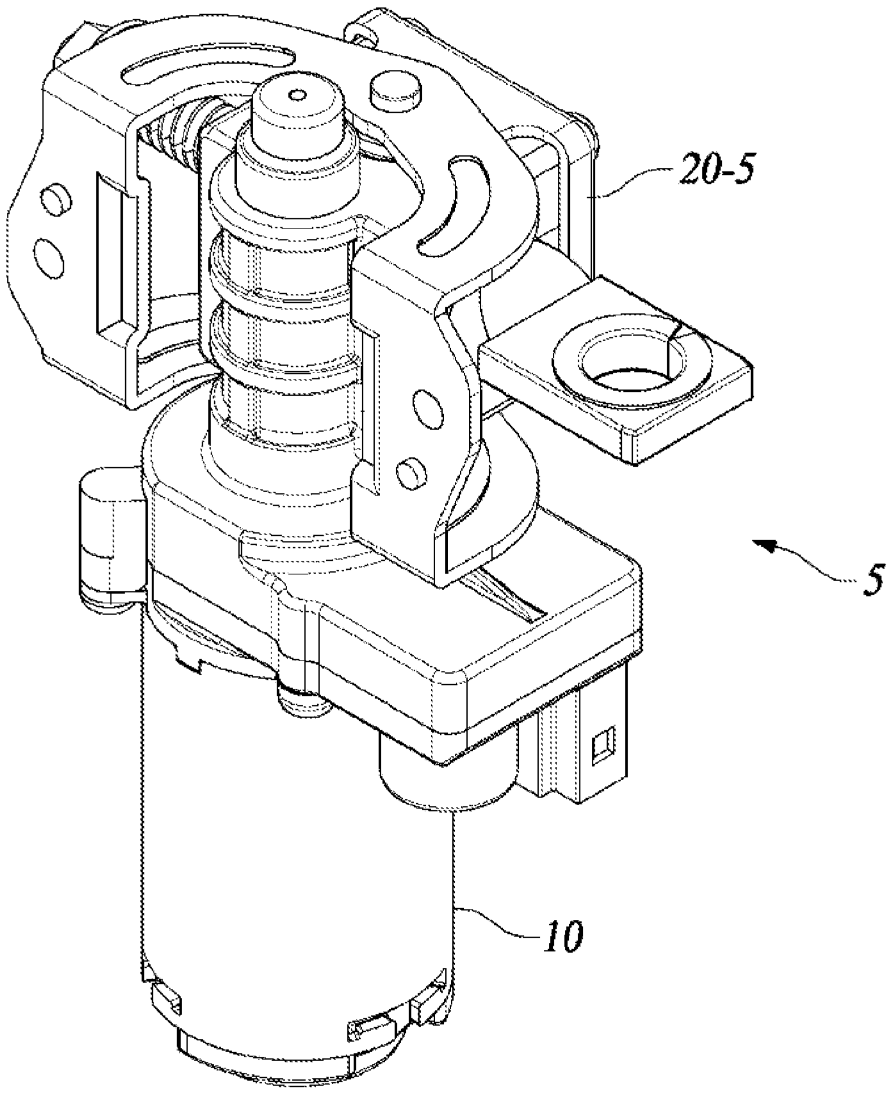

[FIG. 4]
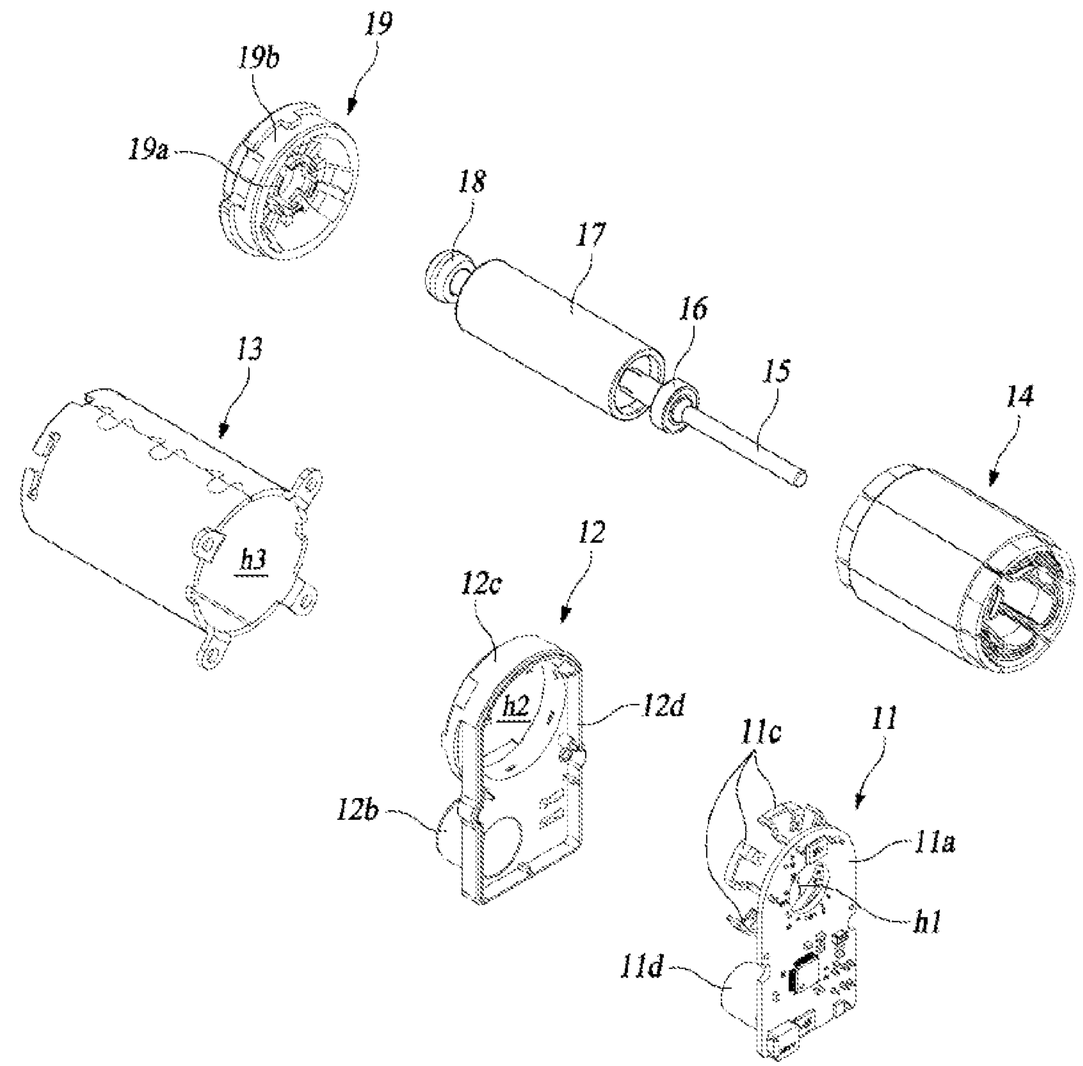

[FIG. 5]
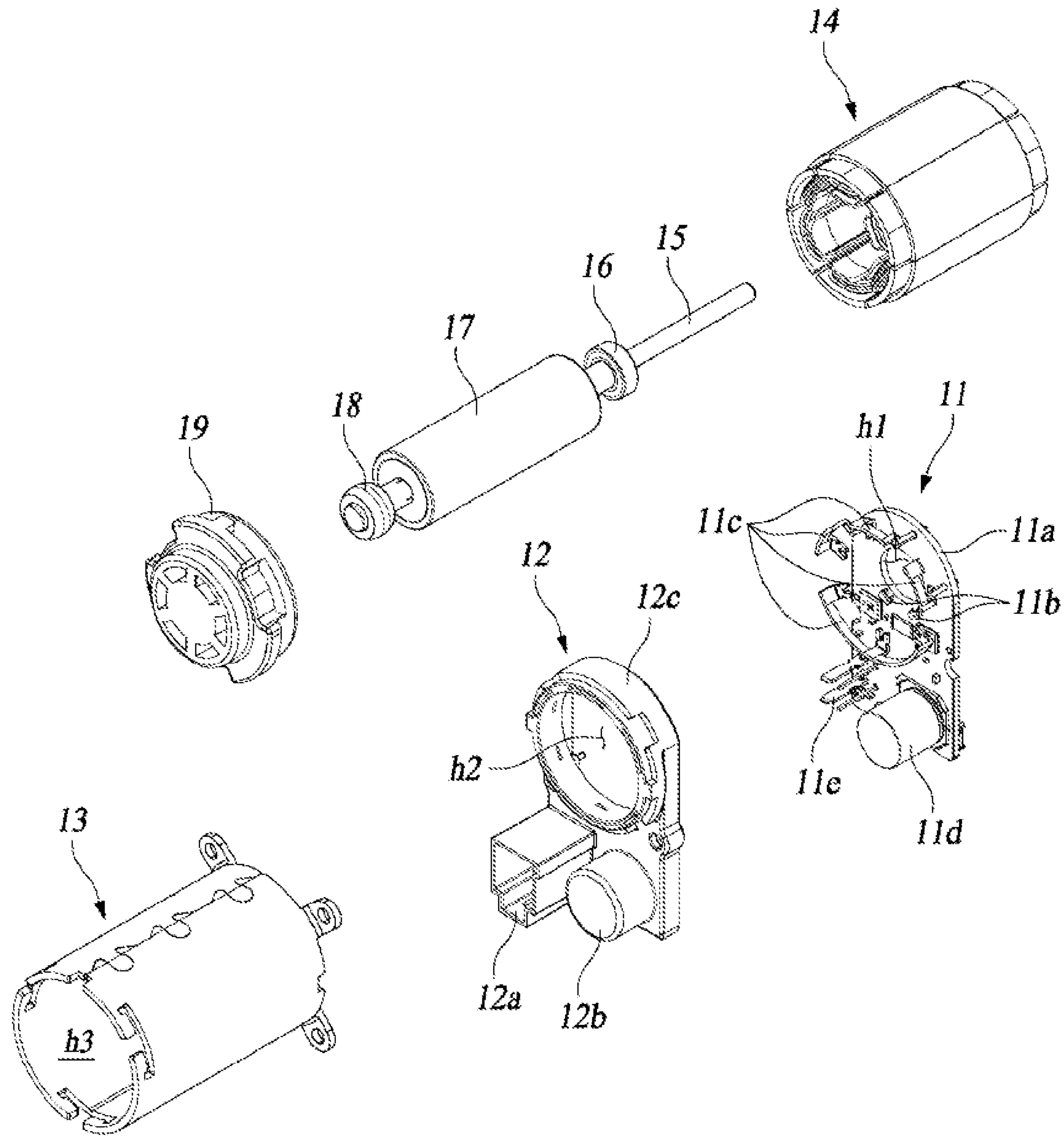

[FIG. 6]
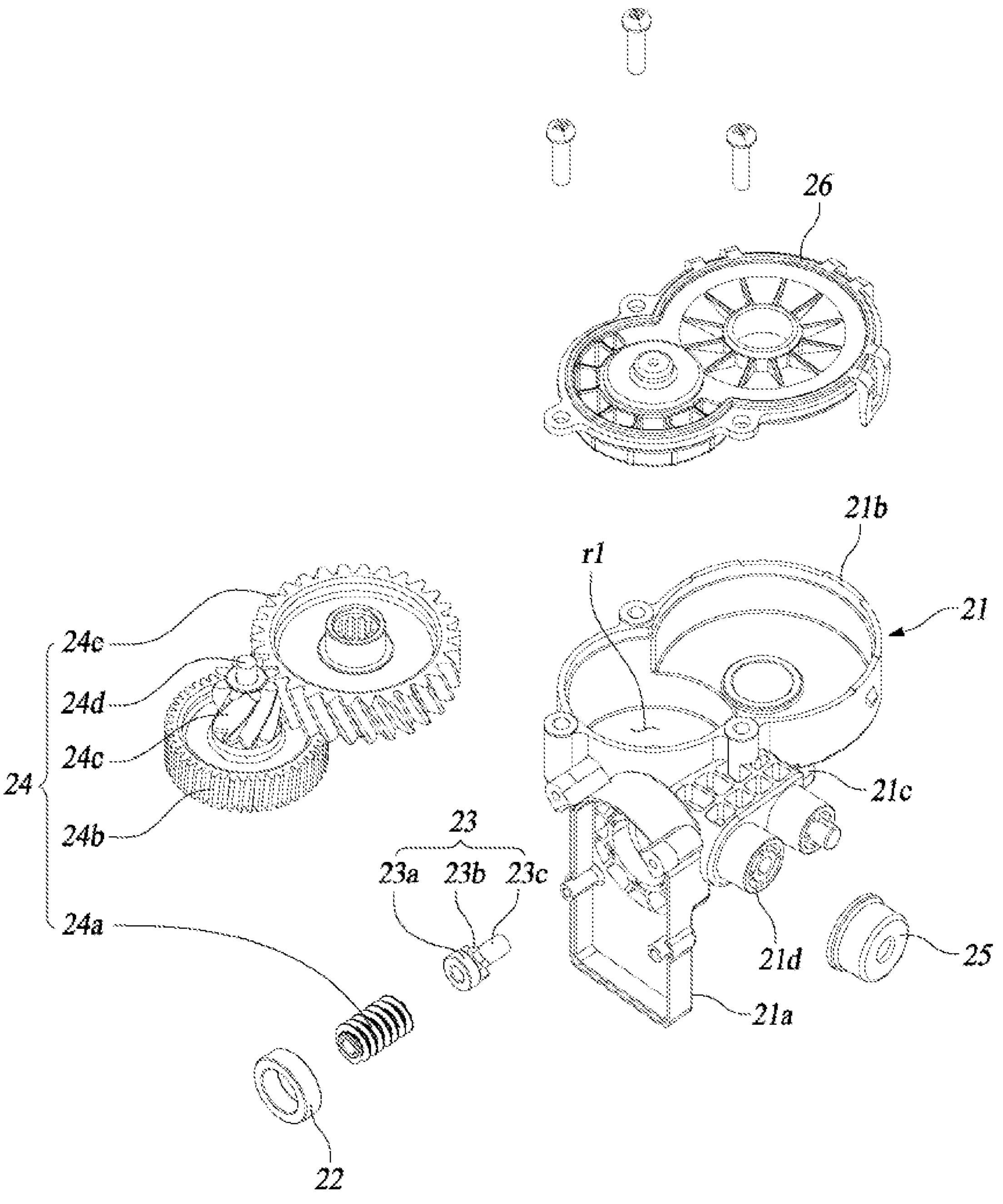

[FIG. 7]
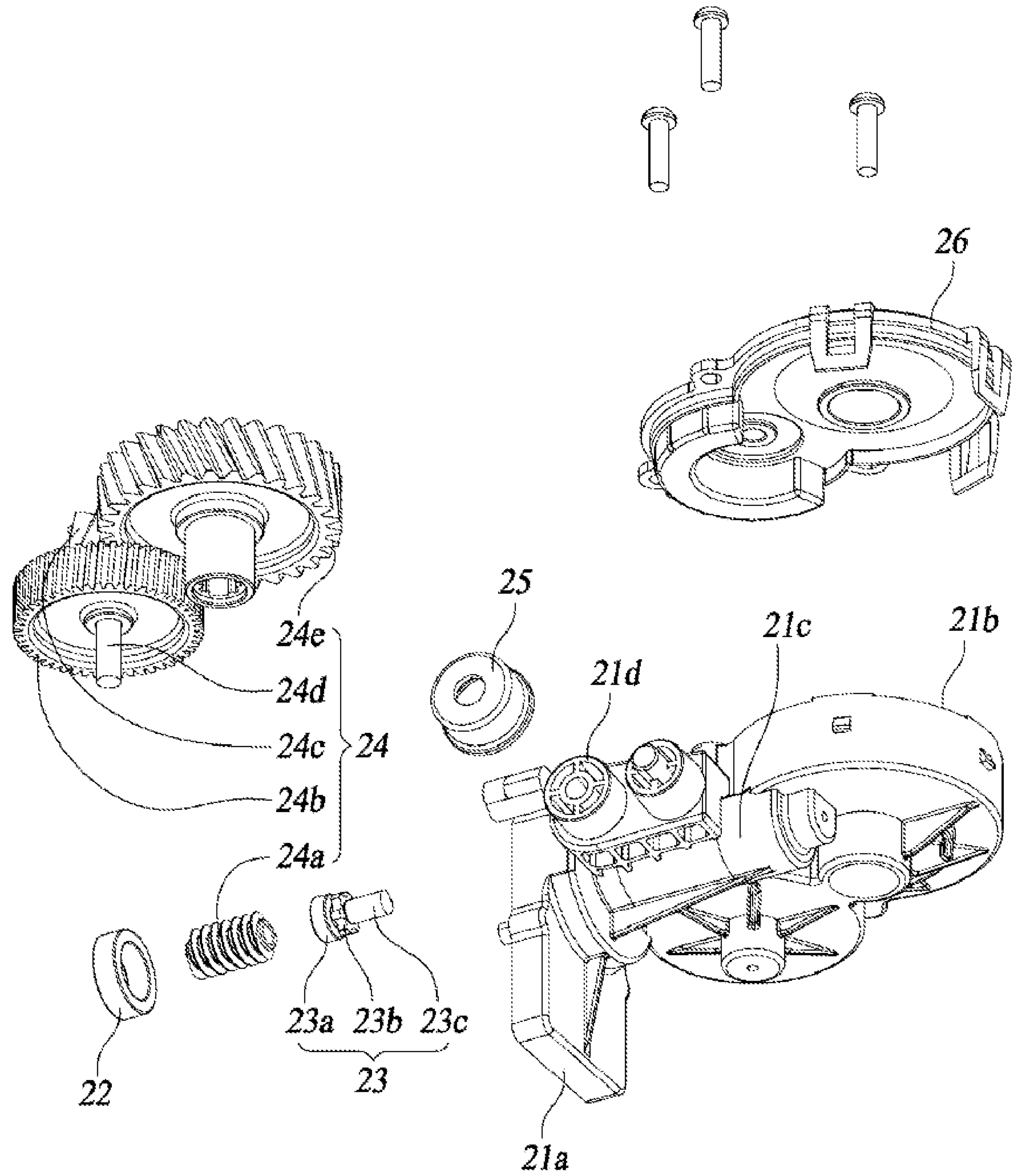

[FIG. 8a]
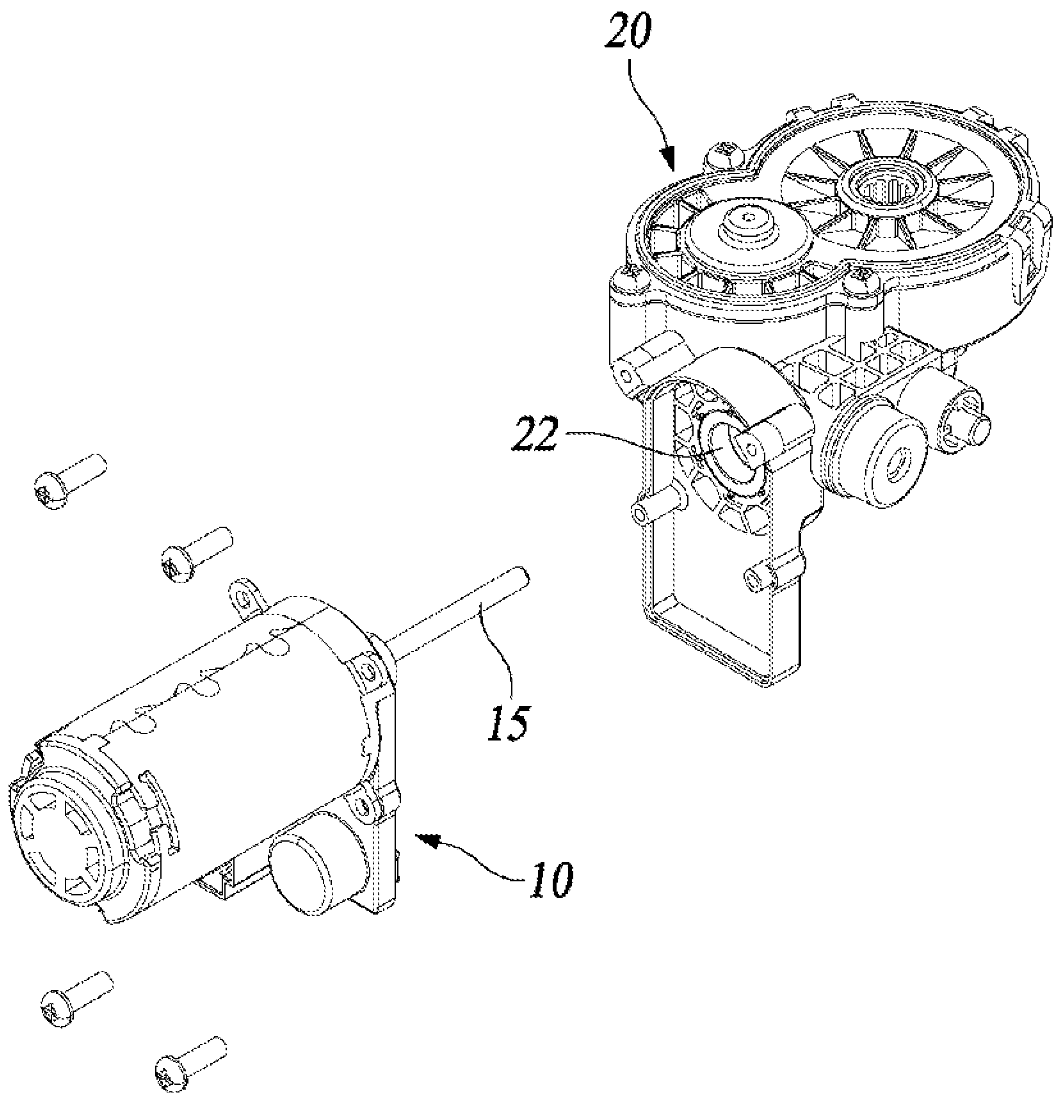

[FIG. 8b]
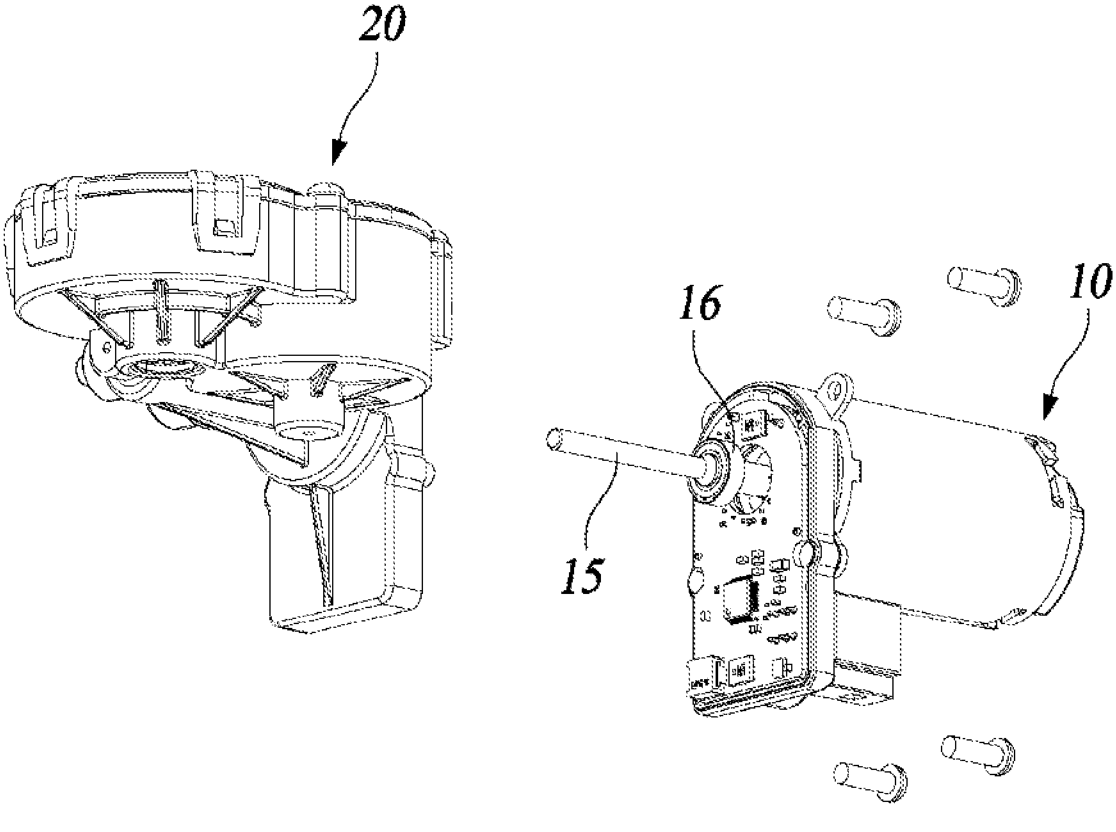

[FIG. 9a]
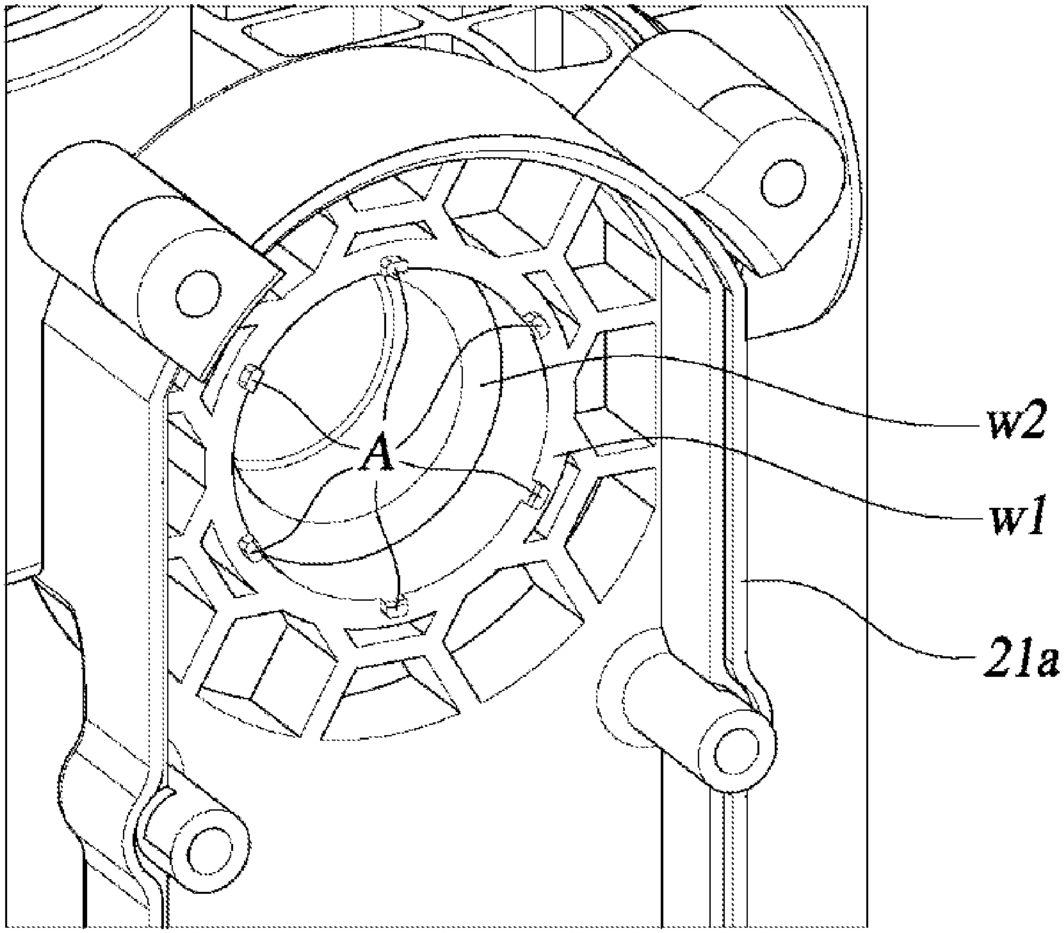

[FIG. 9b]
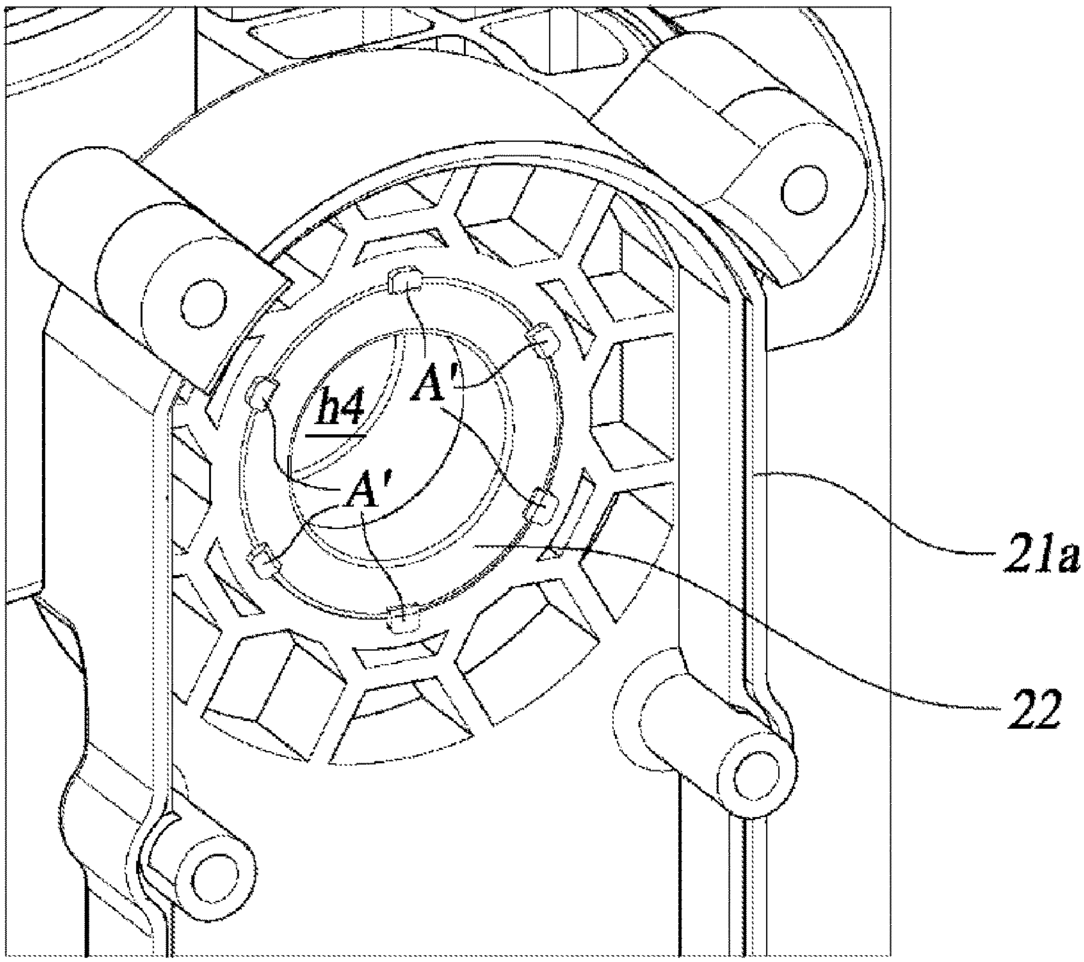

[FIG. 10]
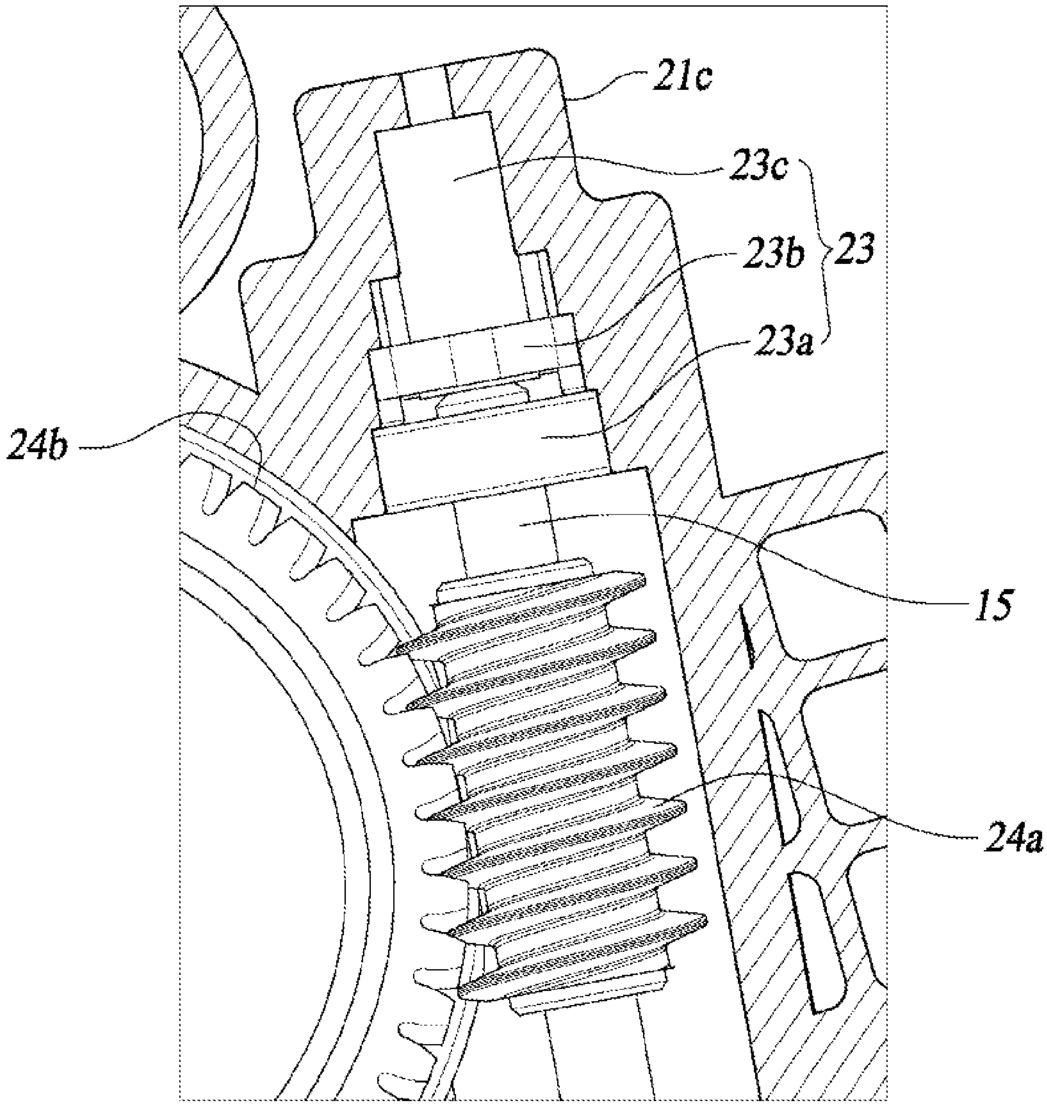

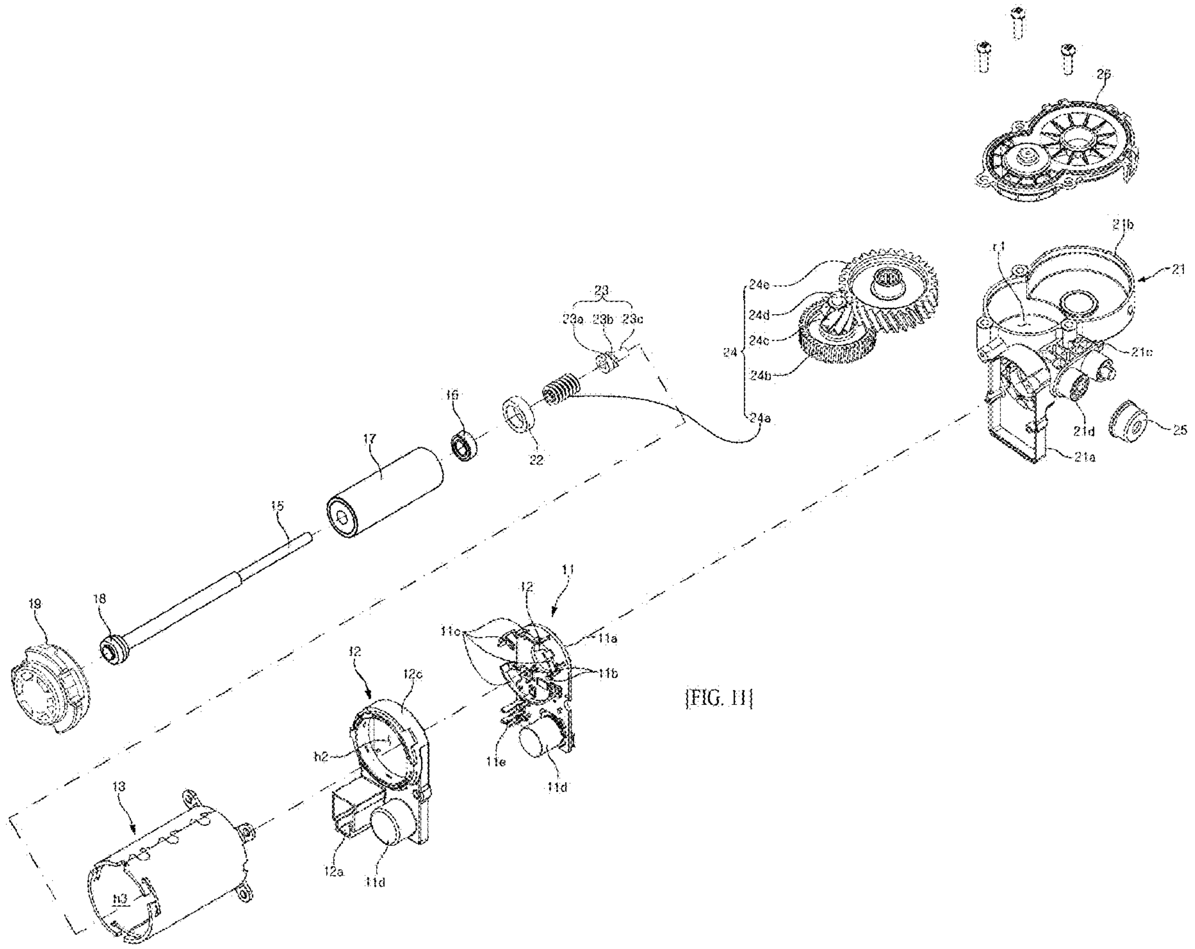
[FIG. 11]

ACTUATOR FOR AUTOMOTIVE POWER SEAT SHARING BLDC MOTOR

CROSS-REFERENCE TO RELATED APPLICATIONS

The present application claims priority to Korean Patent Application No. 10-2022-0061228, filed May 19, 2022, the entire contents of which are incorporated herein for all purposes by this reference.

TECHNICAL FIELD

The present disclosure relates to various types of actuators constituting an automotive power seat, and more particularly, to an actuator group that shares a Brushless DC (BLDC) motor, thereby reducing the manufacturing cost and overall form factor.

BACKGROUND

Although DC motors were mainly used for actuators of conventional power seats, considering low noise and long-life characteristics of a BLDC motor, it is highly likely that a BLDC motor will be applied to an actuator of a power seat in the future, and it is expected that a BLDC motor will be widely applied to various actuators required for a power seat.

There are many advantages when applying a BLDC motor to a power seat, but various parts necessary for sensing a position of a rotor, and switching, controlling and protecting power must be additionally mounted.

On the other hand, according to a trend of high-end automobiles and for the purpose of improving convenience, a plurality of actuators are configured even in a single power seat, and in addition to an original function of a seat, actuators must be accommodated within a limited space, and each function has different rotary/linear drive, reduction ratio, required torque, and mounting posture. Therefore, actuators are designed for each functional requirement. In this regard, conventionally, motors have been used for each function of the actuator, but there was a problem in that various production facilities had to be built in order to manufacture different motors for each function.

SUMMARY

The present disclosure aims to provide an actuator group for an automotive power seat that can share a motor of various actuators configured in the power seat.

In addition, the present disclosure aims to provide an actuator group for an automotive power seat that can reduce manufacturing cost of various actuators configured in the power seat.

In addition, the present disclosure also aims to provide an actuator group for an automotive power seat that employs a BLDC motor but has a more compact form factor.

Objects of the present disclosure not mentioned above may be more clarified or added through specific details for carrying out the invention.

According to an embodiment of the present disclosure, an actuator group for an automotive power seat includes: three or more types of actuators constituting the power seat of the vehicle, and each actuator of the actuator group includes: a motor assembly having a BLDC motor configured therein; and a reducer assembly coupled to the motor assembly on a side where a motor shaft of the BLDC motor extends and receiving a rotational force of the BLDC motor to decelerate, and the reducer assembly is configured differently depending on a type of an actuator, but the motor assembly is shared.

The actuator comprised in the actuator group for an automotive power seat described hereabove may be any one among a recliner actuator for adjusting an angle of a backrest of the power seat, a relax actuator for adjusting an angle of a backrest of the power seat and a height of a front portion of the power seat, a legrest actuator for adjusting a tilting angle of a legrest of the power seat; a legrest extension actuator for adjusting an extension position of the legrest of the power seat, a tilt actuator for adjusting a height of a front portion of the power seat up and down, a slide actuator for sliding a position of the power seat back and forth, and a height actuator for adjusting an entire height of the power seat up and down.

In the actuator group for an automotive power seat described hereabove, the motor assembly may include: a PCB having a through hole through which the motor shaft passes and a sensor for detecting a position of a rotor of the BLDC motor mounted on one side thereof; and installed in a direction perpendicular to the motor shaft, but may expose another side of the PCB, and the reducer assembly may include: a reducer housing accommodating an extension of the motor shaft and reduction gears therein, and the reducer housing may be coupled to the motor assembly while covering another side of the exposed PCB.

In the actuator group for an automotive power seat described hereabove, the motor shaft may be rotatably supported using two shaft bearings, and a second shaft bearing among the two shaft bearings may be located in the reducer housing of the reducer assembly.

In the actuator group for an automotive power seat described hereabove, the motor assembly may include: a PCB having a through hole through which the motor shaft passes and a sensor for detecting a position of a rotor of the BLDC motor mounted on one side thereof; and installed in a direction perpendicular to the motor shaft, a bearing guide wrapping around an outer circumferential surface of the second shaft bearing and fixed inside the reducer housing is provided to the motor assembly, and an outer diameter of the second shaft bearing may be smaller than an inner diameter of the through-hole of the PCB such that the second shaft bearing passes through the through-hole of the PCB during assembly.

In the actuator group for an automotive power seat described hereabove, a material of the bearing guide may be softer than a material of the reducer housing to reduce vibration and noise generated during an operation of the BLDC motor.

In the actuator group for an automotive power seat described hereabove, an end washer contacting one end of the motor shaft; and an end rubber elastically supporting the end washer may be located in a cylindrical hole of the reducer housing, and in the actuator group for a power seat further includes a guide pipe having a through-hole through which the motor shaft passes and coupled to the reducer housing to prevent the end washer from leaving.

In the actuator group for an automotive power seat described hereabove, the reducer assembly may include: a gear set including at least a worm coupled to one side of the motor shaft and a worm wheel tooth-meshed with the worm, and the number of gears, gear ratio, gear pitch and a helix angle of the gear set may be set depending on a type of an actuator.

According to the actuator group for an automotive power seat of the present disclosure, it is possible to reduce manufacturing cost of various actuators configured in the power seat by allowing the motor assembly to be shared.

In addition, according to the actuator group for an automotive power seat of the present disclosure, the reducer housing of the reducer assembly covers the other side of the exposed PCB and is coupled to the motor assembly, thereby enabling shared use of the motor assembly and reducing the form factor of the actuator.

In addition, according to the actuator group for an automotive power seat of the present disclosure, by disposing the second shaft bearing serving to support one side of the motor shaft in the reducer housing and making the second shaft bearing be supported by the reducer housing, it is possible to configure a more compact actuator.

In addition, according to the actuator group for an automotive power seat of the present disclosure, by providing the bearing guide surrounding the second shaft bearing, an outer diameter of the second shaft bearing may be made smaller, and an inner diameter of the through-hole of the PCB may be made smaller, thereby reducing a size (width) of the PCB and a form factor of the actuator.

DESCRIPTION OF DRAWINGS

FIG. 1*a* and FIG. 1*b* are a perspective view illustrating an actuator included in an actuator group for an automotive power seat according to an embodiment of the present disclosure, FIG. 1*a* is a recliner actuator and FIG. 1*b* is a legrest actuator.

FIG. 2*a* and FIG. 2*b* are a perspective view illustrating an actuator included in an actuator group for an automotive power seat according to an embodiment of the present disclosure, FIG. 2 (*a*) is a legrest extension actuator and FIG. 2 (*b*) is a relax actuator.

FIG. 3 is a perspective view illustrating an actuator included in an actuator group for an automotive power seat according to an embodiment of the present disclosure, which is a tilt actuator.

FIGS. 4 and 5 are perspective views illustrating detailed configurations of the motor assembly according to an embodiment of the present disclosure.

FIGS. 6 and 7 are perspective views illustrating detailed configurations of the reducer assembly according to an embodiment of the present disclosure.

FIG. 8*a* and FIG. 8*b* are a perspective view illustrating a situation in which the motor assembly 10 and the reducer assembly are assembled.

FIG. 9*a* shows a situation before assembling the bearing guide to the reducer assembly, and FIG. 9*b* shows a situation after assembling the bearing guide in the reducer assembly.

FIG. 10 is a cross-sectional view centered on an end buffer assembly configured in the reducer assembly.

FIG. 11 is perspective views illustrating detailed configurations of the actuator according to an embodiment of the present disclosure.

DETAILED DESCRIPTION

FIGS. 1 to 3 are perspective views illustrating actuators included in the actuator group for an automotive power seat according to an embodiment of the present disclosure, show various types of actuators configured in the automotive power seat, and each actuator includes a motor assembly 10 and one of several types of reducer assemblies 20-1, 20-2, 20-3, 20-4, 20-5 that are paired and tightly coupled together.

The actuator included in the actuator group for an automotive power seat according to the embodiment of the present disclosure may be a recliner actuator 1 that adjusts an angle of the backrest of the power seat, a relax actuator 4 that adjusts an angle of a backrest of the power seat and a height of a front portion of the power seat, a legrest actuator 2 that adjusts a tilting angle of a legrest of the power seat, a legrest extension actuator 3 that adjusts a position of a legrest extension of the power seat, a tilt actuator 5 that adjusts a height of the front portion of the power seat up and down, a slide actuator (not illustrated) that slides a position of the power seat back and forth, and a height actuator (not illustrated) that adjusts a height of the entire power seat up and down.

According to the present disclosure, in the recliner actuator 1, the relax actuator 4, the legrest actuator 2, the legrest extension actuator 3, the tilt actuator 5, the slide actuator and the height actuator, the motor assembly 10 used is the same, but the reducer assemblies 20 used are different from each other. The present disclosure provides a recliner reducer assembly 20-1 constituting the recliner actuator 1, a relax reducer assembly 20-4 constituting the relax actuator 4, a legrest reducer assembly 20-2 constituting the legrest actuator 2, a legrest extension reducer assembly 20-1 that constitutes the legrest extension actuator 3, a tilt reducer assembly 20-5 constituting the tilt actuator 5, a slide reducer assembly constituting the slide actuator, and a height reducer assembly constituting the height actuator.

The reducer assembly 20 is configured differently depending on a type of actuator, such that each actuator—such as a recliner, legrest, tilt, or relax actuator-employs a distinct gear structure, reduction ratio, output shaft direction, and housing geometry suited to its functional load, while the motor assembly 10 remains common among them. To enable such shared use and to offset any increase in form factor resulting from the shared configuration, the actuator group adopts a differentiated structural arrangement as described in the following embodiments, compared with conventional actuators.

Hereinafter, the detailed configuration of the motor assembly 10 and the reducer assembly 20; 20-1 is described with reference to the recliner actuator 1, focusing on the components that are commonly applied to each actuator in the actuator group. For instance, the recliner actuator 1 employs a high-torque worm gear set; the legrest actuator 2 adopts a medium-reduction helical gear configuration; the legrest extension actuator 3 uses a compact reducer with a small helix angle for smoother extension; and the tilt actuator 5 utilizes a low-ratio gear train to achieve faster vertical displacement.

FIGS. 4 and 5 are perspective views illustrating detailed configurations of the motor assembly 10 according to the embodiment of the present disclosure, and FIGS. 6 and 7 are perspective views illustrating detailed configurations of the reducer assembly 20, 20-1 according to the embodiment of the present disclosure.

The motor assembly 10 includes a BLDC motor, and includes a PCB module 11, a PCB cover 12, a stator housing 13, a stator assembly 14, a motor shaft 15, a rotor 17, a first shaft bearing 18, a second shaft bearing 16 and a bearing cover 19.

The PCB module 11 includes a sensor 11*b* such as a hall sensor that detects a position of the rotor of the BLDC motor, a terminal 11*c* to which an end of a coil formed in the stator assembly 14 is coupled by soldering, etc., and a PCB 11*a* having a central through-hole h1 that allows the motor shaft 15 to pass partially through or align coaxially with the rotor 17 and the stator assembly 14, and the sensor 11*b* mounted on one side thereof, and installed in a direction perpendicular to the motor shaft. In addition to the sensor 11*b* being installed on one side (inner side) of the PCB 11*a*, as illustrated, a capacitor 11*d* and a connector pin lie for configuring a connector for an electrical connection with an outside are installed therein. The capacitor 11*d* and the connector are located on an inner surface of the PCB 11*a*, but are disposed on a side of the stator housing 13 so as to be parallel to the motor shaft. On the other side (outer surface) of the PCB 11*a*, power devices and controllers are installed for power switching and control.

Since the PCB 11*a* is installed in a direction perpendicular to the motor shaft 15, direct installation of the sensor 11*b* that detects a position of the rotor on one side thereof is allowed, and since capacitors, connectors and even semiconductor devices for switching and controlling power and the like are installed in the PCB 11 *a* for the BLDC motor, it is not necessary to install another PCB to mount them in a local or remote location.

The PCB cover 12 includes a short cylinder portion 12*c* that is similar to a cylindrical shape of the stator housing 13, extends short and has a hollow h2 communicating with the through-hole of the stator housing 13, a side wall portion 12*d* that is connected to the short cylinder portion 12*c* and surrounds a side surface of the PCB 11*a*, and a cylindrical well portion 12*b* that accommodates the capacitor 11*d*, and the PCB cover 12 covers one side (inner side) of the PCB 11*a* while accommodating the PCB module 11 therein, and leaves the other side (outer side) of the PCB 11*a* open and exposed.

The stator housing 13 has a substantially cylindrical shape with a hollow h3, and accommodates the stator assembly 14 therein, and in an axial direction, one end of the stator housing 13 is coupled to the bearing cover 19 and the other end thereof is coupled to the PCB cover 12. In the stator assembly 14, a coil, a core, and an insulator are circumferentially arranged around the rotor 17, and the rotor 17 includes a permanent magnet and a core arranged radially while surrounding the motor shaft 15, and the rotor 17 is integrally coupled with the motor shaft 15 penetrating the rotor 17.

The motor shaft 15 is rotatably supported by two shaft bearings. The motor shaft 15 is rotatably supported at one end by the first shaft bearing 18 coupled to the bearing cover 19 and is rotatably supported at the other end by the second shaft bearing 16. The motor shaft 15 is supported at one point by the first shaft bearing 18 and at the other point by the second shaft bearing 16 with respect to the rotor 17. In the present disclosure, the second shaft bearing 16 becomes to be located in the reducer housing 21 of the reducer assembly 20, and the other side of the motor shaft 15 is supported by a supporting force of the reducer housing 21.

In the present disclosure, while the motor assembly 10 is shared, the second shaft bearing 16 supporting the other side of the motor shaft 15 is placed in the reducer housing 21 and supported by the reducer housing 21 (specific details will be described later), thus it is possible to configure a more compact actuator.

The bearing cover 19 is inserted into and coupled to one end of the stator housing 13 by its periphery 19*b* being inserted into and coupled to one end of the stator housing 13, and is coupled to the first shaft bearing 18 by a fitting piece 19*a* formed therein being coupled to the first shaft bearing 18.

The reducer assembly 20 is a module that couples the motor assembly 10 on a side where the motor shaft 15 (that is, the motor shaft of the BLDC motor) of the motor assembly 10 extends and receives a rotational force of the BLDC motor to perform deceleration and the like. The reducer assembly 20 includes the reducer housing 21, the bearing guide 22, an end buffer assembly 23 (including guide pipe 23*a*, end washer 23*b*, end rubber 23*c*), a mount cap 25, a gear set 24, and a gear cover 26.

The reducer housing 21 accommodates an extension of the motor shaft and gears for reduction therein, and the reducer housing 21 is integrally formed by injection molding of portions including a PCB cover portion 21*a*, a gear seating portion 21*b*, a shaft accommodating portion 21*c*, and a mount protrusion 21*d*. The PCB cover portion 21*a* is fastened to the motor assembly 10 by a bolt or the like, covers the other side of the PCB 11*a* exposed from the motor assembly 10, and mates with the PCB cover 12. In this configuration, a uniform mounting interface between the motor assembly 10 and various types of reducer housings 21 allows physical and electrical compatibility, thereby realizing shared use of the BLDC motor module among multiple actuators. The other side of PCB 11*a* configured in the motor assembly 10 is designed to be open and exposed to the outside, but the exposed surface is closed by the reducer housing 21 of the reducer assembly 20. Though the reducer assembly is changed depending on a type of the actuator, the PCB module 11 is configured to be accommodated in a closed space formed between the motor assembly and the reducer assembly. In the reducer assembly 20, as the PCB cover portion 21*a* of the reducer housing 21 is coupled to the motor assembly 20 while covering the other side of the exposed PCB 11*a*, it becomes possible to reduce a form factor of the actuator while fulfilling shared use of the motor assembly. By coupling the PCB cover portion 21*a* of the reducer housing 21 to the motor assembly 10 while covering the exposed side of the PCB 11*a*, shared use of the motor assembly is achieved and the overall form factor of the actuator is minimized.

The gear seating portion 21*b* forms an accommodating space r1 that accommodates the gears 24*b*, 24*c*, 24*e* and the gear shaft 24*d*, except a worm 24*a* of the gear set 24 therein, and the accommodating space r1 is covered by the gear cover 26. The shaft accommodating portion 21*c* connects the gear seating portion 21*b* and the PCB cover portion 21*a* arranged in a substantially perpendicular direction to each other so that they are integrally coupled to each other, and provides a space for accommodating and supporting one end of the motor shaft 15 to which the worm 24*a* is coupled and the end buffer assembly 23. The mount protrusion 21*d* is used to mount the actuator (reducer assembly), the mount protrusion 21*d* protrudes outward from the reducer housing 21, and when mounted, the mount cap 25 is used to adjust a clearance with a mounting point.

As described above, the second shaft bearing 16, one of the two shaft bearings, is located and supported in the reducer housing 21 of the reducer assembly 20, and vibration generated during high-speed rotation of the BLDC motor is transmitted to the reducer housing 21 and may cause noise. In order to prevent or reduce such vibration and noise, according to the embodiment of the present disclosure, the bearing guide 22 mounted inside the reducer housing 21 is configured.

FIG. 8*a* and FIG. 8*b* are a perspective view illustrating a situation in which the motor assembly 10 and the reducer assembly 20 are assembled, FIG. 9*a* shows a situation before assembling the bearing guide 22 to the reducer assembly 20, and FIG. 9*b* shows a situation after assembling the bearing guide 22 in the reducer assembly 20.

The bearing guide 22 may be first assembled to the second shaft bearing 16 or to one of the reducer housings 21 by a method such as press-fitting, thermal fusion, caulking, or impression, and then assembled with the other side.

As illustrated in FIG. 9*a*, a structure in which the bearing guide 22 can be seated is provided at the beginning of the shaft accommodating portion 21*c*, to an inside of the PCB cover portion 21*a* of the reducer housing 21, and a first annular portion w1 and a second annular portion w2 having a smaller inner diameter than the first annular portion w1 are formed in such a way that the second annular portion w2 forms a step with the first annular portion w1. In a state where the bearing guide 22 is positioned inside the first annular portion w1, an inner surface thereof is supported by a step formed with the second annular portion w2. In addition, fixing protrusions A uprightly arranged along the outer axial direction at one end of the first annular portion w1 is pressed after the bearing guide 22 is seated, for example, to prevent the bearing guide 22 from escaping outward.

After the bearing guide 22 is mounted inside the reducer housing 21, when assembling the motor assembly 10 and the reducer assembly 20, the second shaft bearing 16 fixed to the motor shaft 15 of the motor assembly 10 is seated in a hollow part h4 of the bearing guide 22, so the bearing guide 22 wraps around and supports an outer circumference of the second shaft bearing 16. Furthermore, an outer diameter of the second shaft bearing 16 is smaller than an inner diameter of the through-hole h1 of the PCB 11*a*, so that the second shaft bearing 16 may pass through the through-hole h1 during assembly. This dimensional relationship facilitates easy alignment of the motor assembly and the PCB without deformation and ensures precise coaxiality between the shaft and the stator assembly. The reducer housing 21 has a complex shape and is made of a material with high rigidity for supporting the gear set 24 and the motor shaft 16, whereas, the bearing guide 22 is made of a material softer than that of the reducer housing 21, thereby reducing vibration and noise generated during operation of the BLDC motor can be reduced. The reducer housing 21 including the PCB cover portion 21*a*, gear-mounting portion 21*b*, and shaft-accommodating portion 21*c* is integrally formed by injection molding. As a result, the assembly accuracy is improved, vibration and noise are reduced, and the overall number of parts is decreased, thereby simplifying the assembly process and enhancing structural rigidity.

In addition, by forming an outer diameter of the second shaft bearing 16 to be smaller than an inner diameter of the through-hole h1 of the PCB 11*a*, the second shaft bearing 16 may pass through the through-hole h1 of the PCB 11*a* during the assembly.

According to the present disclosure, by providing the bearing guide 22 surrounding the second shaft bearing 16, an outer diameter of the second shaft bearing 16 may be made smaller and an inner diameter of the through-hole h1 of the PCB 11*a* may be made smaller, and accordingly, the size (width) of the PCB and the form factor of the actuator may be reduced.

Assume that as an outer diameter of the second shaft bearing increases, if an inner diameter of the through-hole h1 of the PCB 11*a* has to be made greater, a mounting area of the parts that may be mounted on the PCB 11*a* is consumed more. From another perspective, by reducing consumption of such a mounting area, a wider mounting area may be secured, and various elements necessary for driving the BLDC motor may be mounted together with the sensor 11*b*, thereby eliminating a need to install another PCB locally or remotely to mount them.

According to the embodiment of the present disclosure, the end buffer assembly 23, which is configured to stabilize an axial position of the motor shaft 15 at the other end of the motor shaft 15 and to absorb a thermal expansion of the motor shaft 15, is characterized in that it is configured in the reducer housing 21, specifically, the shaft accommodating portion 21*c* of the reducer housing 21 (see FIGS. 6, 7 and 10).

In the end buffer assembly 23, an end washer 23*b* contacting one end of the motor shaft 15 and an end rubber 23*c* elastically supporting the end washer 23*b* is positioned in a multi-stage cylindrical hole of the reducer housing 21 (specifically, the shaft accommodating portion 21*c*), and a guide pipe 23*a* having a through-hole through which the motor shaft 15 passes and coupled to the reducer housing 21 to prevent the end washer 23*b* from leaving are equipped therewith.

According to the embodiment of the present disclosure, in the reducer assembly, the configuration of the gear set 24 and the like may be different per actuator, but inner shapes of the PCB cover portion 21*a* and the shaft accommodating portion 21*c* together with the bearing guide 22 and the end buffer assembly 23 in the reducer housing 21 are preferably identical.

In addition, the reducer assembly 20 includes a gear set 24 comprising at least a worm 24*a* coupled to one side of the motor shaft 15 and a worm wheel 24*b* tooth-meshed with the worm 24*a*. Depending on actuator type, the internal gear train layout, gear axis orientation, housing shape, and mounting posture are selectively varied to achieve desired output motion. The number of gears, gear ratio, gear pitch, and helix angle of the gear set 24 are accordingly adjusted to meet torque and motion characteristics required for each actuator. The extended end of the motor shaft 15 is integrally connected to the gear worm 24*a* within the shaft-accommodating portion 21*c*. This integral coupling minimizes backlash and ensures stable transmission of the rotational force of the BLDC motor to the worm wheel 24*b*. Furthermore, the extended end of the motor shaft 15, to which the gear worm 24*a* is coupled, is rotatably supported by the second shaft bearing 16 located on the motor assembly side. Accordingly, the gear worm 24*a* is indirectly supported by the second shaft bearing 16 via the motor shaft 15, thereby maintaining coaxial alignment and ensuring stable torque transmission from the BLDC motor to the reduction gear set 24. The driving force of the BLDC motor is transmitted in the order of the motor shaft-worm-worm wheel-first helical wheel-second helical wheel 24*e*.

Depending on a type of an actuator, the first helical wheel 24*c* and the second helical wheel 24*e* may not be configured. For example, like the recliner actuator 1, the relax actuator 4, the legrest actuator 2, the legrest extension actuator 3, and the tilt actuator 5 include a worm coupled to the other side of the motor shaft and a worm wheel tooth-meshing with the worm. By the way, both sides of the worm wheel in an axial direction have washers interposed therebetween, and the worm wheel is supported by the reducer housing so that the worm wheel can be rotatable in place, and a thread is formed on an inner circumferential surface of a hollow formed at a center to tooth-mesh with a lead screw penetrating the washers, so that the worm wheel drives the lead screw. The driving force of the BLDC motor is transmitted in the order of the motor shaft-worm-worm wheel-lead screw.

Even if the types of actuators are different, the reducer assembly of each actuator includes at least a worm 24*a* and a worm wheel 24*b* tooth-meshing with the worm 24*a*. Also, depending on a type of an actuator, the number of gears in the gear set 24 may differ, and the gear ratio (e.g., 20:1-80:1), gear pitch, and helix angle (e.g., 15°-30°) are selectively adjusted depending on the actuator type to achieve the required torque and motion characteristics.

By integrating the PCB cover and the gear housing into a single injection-molded unit, the actuator achieves reduced part count, simplified assembly, and improved durability. In addition, compared to the modular gear assemblies of the prior art, the integrated structure provides enhanced vibration damping and dimensional precision, yielding an unexpected improvement in performance and reliability. FIG. 11 is an exploded perspective view illustrating the actuator according to an embodiment of the present disclosure, in which all components are shown as described above with reference to FIGS. 4 to 7. As such, the actuator according to an embodiment of the present disclosure includes a motor assembly and a reducer assembly.

REFERENCE NUMERALS

| | |
|---|---|
| 1, 2, 3, 4, 5: Actuator | |
| 10: motor assembly | 11: PCB module |
| 12: PCB cover | 13: stator housing |
| 14: stator assembly | 15: motor shaft |
| 16: second shaft bearing | |
| 17: rotor | 18: first shaft bearing |
| 19: bearing cover | 20: reducer assembly |
| 20-1: recliner reducer assembly | 20-2: legrest reducer assembly |
| 20-3: legrest extension reducer assembly | |
| 21: reducer housing | 22: bearing guide |
| 23: end play | 24: gear set |
| 25: mount cap | 26: gear cover |

What is claimed is:

1. An actuator for an automotive power seat, comprising:
a motor assembly including:
a BLDC motor comprising a rotor, a stator assembly, and a motor shaft rotatably supporting the rotor;
a PCB module having a through-hole through which the motor shaft passes, the PCB module including a sensing sensor configured to detect a position of the rotor and a PCB disposed in a direction perpendicular to the motor shaft;
a second shaft bearing rotatably supporting the motor shaft;
a stator housing having a hollow portion accommodating the stator assembly;
a PCB cover including a short cylindrical portion communicating with the hollow portion of the stator housing, a side-wall portion surrounding a side surface of the PCB, and a cylindrical well portion configured to receive a capacitor;
a first shaft bearing rotatably supporting the motor shaft at a side opposite to the second shaft bearing;
a bearing cover coupled to the first shaft bearing and fitted to the stator housing; and
a reduction-gear assembly coupled to the motor assembly at a side where the motor shaft extends, the reduction-gear assembly receiving a rotational force of the motor to perform speed reduction, wherein the reduction-gear assembly comprises:
a reduction-gear housing accommodating a gear set including reduction gears and receiving an extended portion of the motor shaft;
the gear set further including at least a gear worm coupled to one end of the motor shaft and a worm wheel engaged with the gear worm; and
a bearing guide surrounding an outer circumferential surface of the second shaft bearing and positioned inside the reduction-gear housing, wherein the reduction-gear housing comprises:
a PCB-cover portion covering the PCB of the PCB module exposed from the motor assembly and coupled to the motor assembly;
a gear-mounting portion in which the gear set is accommodated; and
a shaft-receiving portion connecting the PCB-cover portion and the gear-mounting portion and receiving one end of the motor shaft on which the gear worm of the gear set is coupled,
wherein the reduction-gear housing is integrally formed.

2. The actuator according to claim 1, wherein an outer diameter of the second shaft bearing is smaller than an inner diameter of the through-hole of the PCB such that the second shaft bearing passes through the through-hole of the PCB during assembly.

3. The actuator according to claim 1, wherein the reduction-gear housing covers an opposite side surface of the PCB and is coupled to the motor assembly.

4. The actuator according to claim 1, wherein the reduction-gear assembly further comprises:
an end washer contacting one end of the motor shaft;
an end rubber elastically supporting the end washer and positioned in a cylindrical hole of the reduction-gear housing; and
a guide pipe having a through-hole through which the motor shaft passes, the guide pipe being coupled to the reduction-gear housing to prevent the end washer from being separated,
wherein the shaft-receiving portion of the reduction-gear housing defines a space for accommodating the end washer, the end rubber, and the guide pipe.

* * * * *